(12) United States Patent
Sillador

(10) Patent No.: US 11,710,014 B2
(45) Date of Patent: Jul. 25, 2023

(54) IMAGE FORMING SYSTEM INCLUDING TERMINAL DEVICE THAT SUBSTITUTES OBJECT DATA IN PRINT DATA WITH HASH VALUE IF THE HASH VALUE ACCORDS WITH ANOTHER HASH VALUE, AND IMAGE FORMING APPARATUS THAT SUBSTITUTES HASH VALUE IN PRINT DATA WITH OBJECT DATA, AND IMAGE FORMING METHOD

(71) Applicant: KYOCERA Document Solutions Inc., Osaka (JP)

(72) Inventor: Edward Jay Sillador, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 17/829,159

(22) Filed: May 31, 2022

(65) Prior Publication Data

US 2022/0383057 A1 Dec. 1, 2022

(30) Foreign Application Priority Data

Jun. 1, 2021 (JP) .................................. 2021-092369

(51) Int. Cl.
*G06F 3/12* (2006.01)
*G06K 15/02* (2006.01)
*H04N 1/00* (2006.01)

(52) U.S. Cl.
CPC ....... *G06K 15/1814* (2013.01); *G06F 3/1297* (2013.01); *G06K 15/1807* (2013.01)

(58) Field of Classification Search
CPC .... G06F 3/1211; G06F 3/1247; G06F 3/1285; G06F 3/1297; G06K 15/1807; G06K 15/1814; H04N 1/32283

USPC ................................................ 358/1.11–1.18
See application file for complete search history.

(56) References Cited

U.S. PATENT DOCUMENTS

| | | | | |
|---|---|---|---|---|
| 2007/0206212 | A1* | 9/2007 | Ohno | G06F 3/1218 358/1.14 |
| 2009/0021782 | A1* | 1/2009 | Morimoto | G06K 15/1817 358/1.15 |
| 2015/0077794 | A1* | 3/2015 | Ezoe | G06F 3/1244 358/1.15 |

FOREIGN PATENT DOCUMENTS

| | | | |
|---|---|---|---|
| JP | 2008176542 A | * | 7/2008 |
| JP | 2018199277 A | | 12/2018 |
| JP | 2019001003 A | | 1/2019 |

* cited by examiner

*Primary Examiner* — Chad Dickerson
(74) *Attorney, Agent, or Firm* — IP Business Solutions, LLC

(57) ABSTRACT

An image forming system includes an image forming apparatus and a terminal device. The terminal device converts a document into first print data, generates a second hash value corresponding to second object data in first print data, generates second print data, when the second hash value accords with the first hash value in a first storage device, by substituting the second object data in the first print data with the first hash value, and transmits the second print data to the image forming apparatus. The image forming apparatus substitutes, upon receipt of the second print data, the first hash value included in the second print data with the first object data corresponding to the first hash value and stored in the second storage device, generates second bitmap data by analyzing the second print data subjected to the substitution, and causes an image forming device to execute a printing operation.

7 Claims, 11 Drawing Sheets

D1: 72 500 translate
72 72 scale
50 176 8[8 0 0...8 0 0]
[<c936>]image

D2: /Times-Roman findfont 18
scalefont setfont
72 550 moveto
(Aaaaaa Xxxxxxx
Bbbbb Yyyyyyy
Ccccc Zzzzzzzz)show D3: 85 224 translate
72 72 scale
31 43 8[8 0 0...8 0 0]
[<c936>]image H1: C96D9421D08B9E5059588A94C61A0DBA
H2: E83DB6C358BF83BAA039E2F29106ABFD
H3: A0E8516D48E9D6946ADFAD6268AE46CB

Fig.6

| ID NUMBER N | NUMBER OF TIMES OF USE | DATA AMOUNT (BYTE) | USE FREQUENCY | DATA RATIO | STORAGE PRIORITY R | STORAGE FLAG F |
|---|---|---|---|---|---|---|
| 0001 | 49 | 4205 | 8.07% | 2.18% | 5.13% | 0 |
| 0002 | 9 | 38071 | 1.48% | 19.73% | 10.61% | 1 |
| 0003 | 25 | 1428 | 4.12% | 0.74% | 2.43% | 0 |
| 0004 | 100 | 59532 | 16.47% | 30.85% | 23.66% | 1 |
| 0005 | 65 | 7347 | 10.71% | 3.81% | 7.26% | 1 |
| 0006 | 94 | 73725 | 15.49% | 38.20% | 26.84% | 1 |
| 0007 | 21 | 5572 | 3.46% | 2.89% | 3.17% | 0 |
| 0008 | 3 | 1387 | 0.49% | 0.72% | 0.61% | 0 |
| 0009 | 15 | 763 | 2.47% | 0.40% | 1.43% | 0 |
| 0010 | 74 | 130 | 12.19% | 0.07% | 6.13% | 1 |
| 0011 | 85 | 801 | 14.00% | 0.42% | 7.21% | 1 |
| 0012 | 67 | 24 | 11.04% | 0.01% | 5.53% | 0 |
| TOTAL | 607 | 192985 | 100.00% | 100.00% | 100.00% | — |

USE FREQUENCY = NUMBER OF TIMES OF USE / TOTAL NUMBER OF TIMES OF USE

DATA RATIO = DATA AMOUNT / TOTAL DATA AMOUNT

STORAGE PRIORITY R = (USE FREQUENCY + DATA RATIO) / 2

IMAGE FORMING SYSTEM INCLUDING TERMINAL DEVICE THAT SUBSTITUTES OBJECT DATA IN PRINT DATA WITH HASH VALUE IF THE HASH VALUE ACCORDS WITH ANOTHER HASH VALUE, AND IMAGE FORMING APPARATUS THAT SUBSTITUTES HASH VALUE IN PRINT DATA WITH OBJECT DATA, AND IMAGE FORMING METHOD

INCORPORATION BY REFERENCE

This application claims priority to Japanese Patent Application No. 2021-092369 filed on Jun. 1, 2021, the entire contents of which are incorporated by reference herein.

BACKGROUND

The present disclosure relates to an image forming system and an image forming method, and in particular to a technique to perform printing with high efficiency.

An image forming system is known in which, when a terminal device such as a personal computer (PC) transmits an instruction to an image forming apparatus located on a network, the image forming apparatus executes a printing operation. In the existing image forming systems, when a user designates a document to be printed with the terminal device, the terminal device converts the designated document into print data described in a page description language (PDL) that can be analyzed by the image forming apparatus, and transmits such print data to the image forming apparatus, via the network.

The image forming apparatus unfolds the print data transmitted from the terminal device and converts it into bitmap data (raster image data), and executes the image forming operation (printing operation) on the basis of the bitmap data.

In relation to such an image forming system, a technique is known that includes storing the bitmap data generated by the image forming apparatus by unfolding the print data transmitted from the terminal device, in association with a hash value generated from the bitmap data, and executing, when the hash value that accords with the hash value stored as above is subsequently transmitted from the terminal device, the printing operation on the basis of the bitmap data stored in association with the hash value.

The mentioned technique eliminates the need to generate the bitmap data, when the same document is to be again printed, thereby simplifying the printing operation.

SUMMARY

The disclosure proposes further improvement of the foregoing techniques.

In an aspect, the disclosure provides an image forming system including an image forming apparatus and a terminal device. The terminal device includes a first communication device, a first storage device, and a first control device. The first communication device makes communication with the image forming apparatus. The first storage device stores therein a first hash value corresponding to first object data stored in the image forming apparatus. The first control device includes a processor, and acts as a print controller, when the processor executes a control program. The print controller converts a document to be printed into first print data that can be analyzed by the image forming apparatus, and generates a second hash value corresponding to second object data included in the first print data. When the second hash value accords with the first hash value, the print controller generates second print data by substituting the second object data in the first print data with the first hash value, and transmits the second print data to the image forming apparatus via the first communication device. When the second hash value discords with the first hash value, the print controller transmits the first print data to the image forming apparatus via the first communication device. The image forming apparatus includes a second communication device, a second storage device, an image forming device, and a second control device. The second communication device makes communication with the terminal device. The second storage device stores therein the first object data in association with the first hash value. The image forming device executes a printing operation by forming an image on a recording medium. The second control device includes a processor, and acts as a controller, when the processor executes a control program. The controller generates first bitmap data by analyzing the first print data, upon receipt of the first print data transmitted from the terminal device, via the second communication device, and causes the image forming device to execute the printing operation on a basis of the first bitmap data. Upon receipt of the second print data transmitted from the terminal device, via the second communication device, the controller substitutes the first hash value included in the second print data with the first object data corresponding to the first hash value and stored in the second storage device, generates second bitmap data by analyzing the second print data in which the substitution has been done, and causes the image forming device to execute the printing operation on a basis of the second bitmap data.

In another aspect, the disclosure provides an image forming method executed by an image forming system including a terminal device including a first communication device that makes communication with an image forming apparatus, and a first storage device, and the image forming apparatus including a second communication device that makes communication with the terminal device, a second storage device, and an image forming device that executes a printing operation by forming an image on a recording medium. The image forming method includes steps executed by the terminal device, including a step of storing a first hash value corresponding to first object data stored in the image forming apparatus, in the first storage device, a step of converting a document to be printed into first print data that can be analyzed by the image forming apparatus, and generating a second hash value corresponding to second object data included in the first print data, a step of generating, when the second hash value accords with the first hash value, second print data by substituting the second object data in the first print data with the first hash value, and transmitting the second print data to the image forming apparatus via the first communication device, and a step of transmitting the first print data to the image forming apparatus via the first communication device, when the second hash value discords with the first hash value. The image forming method also includes steps executed by the image forming apparatus, including a step of storing the first object data in the second storage device in association with the first hash value, a step of generating first bitmap data by analyzing the first print data, upon receipt of the first print data transmitted from the terminal device, via the second communication device, and causing the image forming device to execute the printing operation on a basis of the first bitmap data, and a step of substituting, upon receipt of the second print data transmitted from the terminal device, via the second communication device, the first hash value included in the second print data with the first object data corresponding to the first hash value and stored in the second storage device, generating second bitmap data by analyzing the second print data in which the substitution has been done, and causing the image forming device to execute the printing operation on a basis of the second bitmap data.

BRIEF DESCRIPTION OF THE DRAWINGS

FIG. 5 is a schematic drawing showing examples of hash values corresponding to object data;

FIG. 6 is a table showing an example of data structure stored in an object property information storage device;

DETAILED DESCRIPTION

Figure 1:
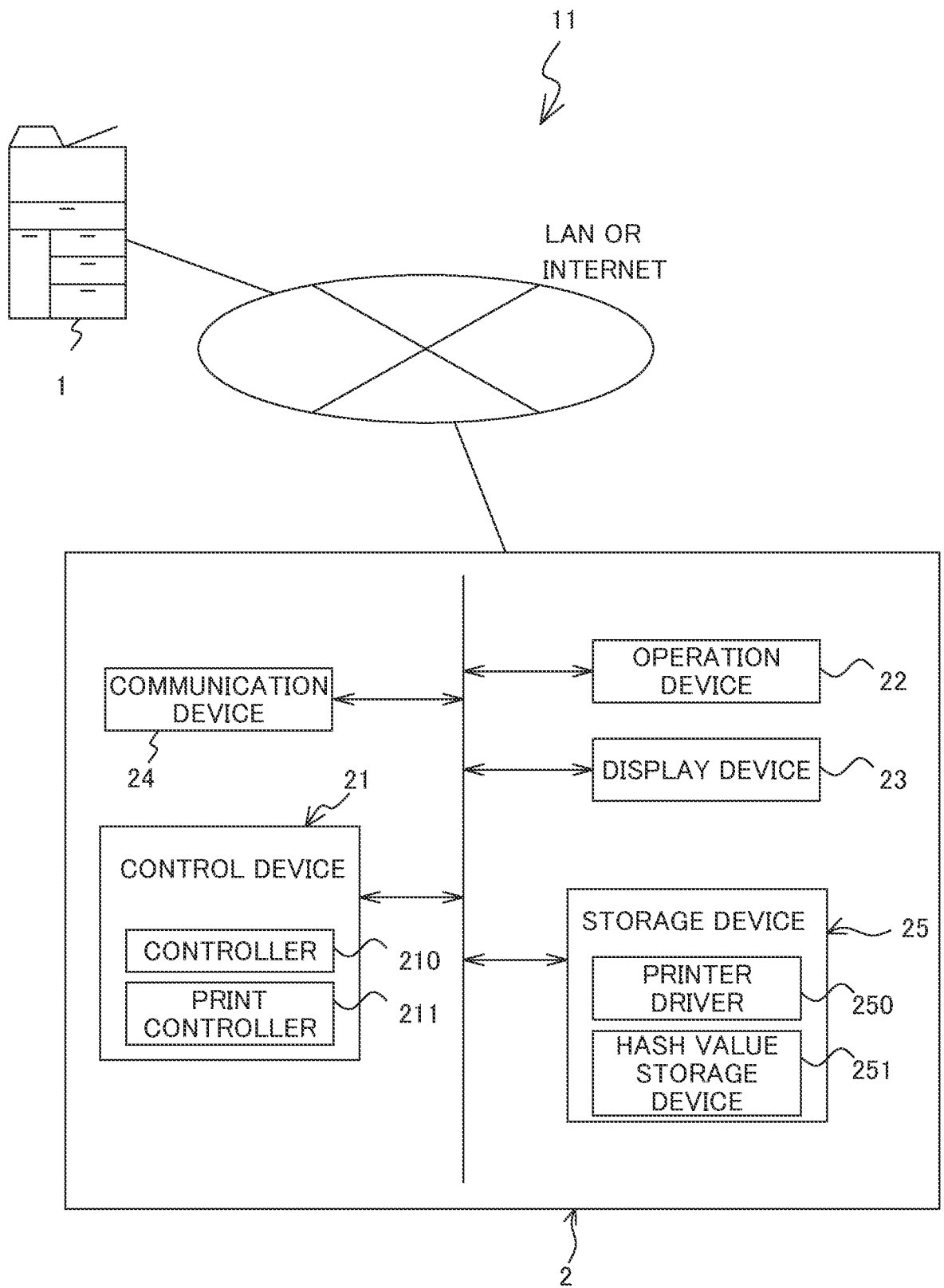
FIG. 1 is a schematic diagram showing general configuration of an image forming system according to an embodiment of the disclosure.

Hereafter, an image forming system and an image forming method according to an embodiment of the disclosure will be described, with reference to the drawings. FIG. 1 illustrates a general configuration of the image forming system 11 according to the embodiment of the disclosure.

The image forming system 11 includes an image forming apparatus 1 and a terminal device 2, located on a network such as the internet. The image forming apparatus 1 is a multifunction peripheral having a plurality of functions, such as copying, printing, scanning, and facsimile transmission.

The terminal device 2 is, for example, a PC. The terminal device 2 includes a control device 21, an operation device 22, a display device 23, a communication device 24, and a storage device 25. The mentioned components can transmit and receive data and signals, to and from each other, via a communication bus.

The operation device 22 includes a keyboard, a mouse, and so forth. The user can input a command or a character to the control device 21 through the operation device 22, or operate a pointer on the screen of the display device 23. The operation device 22 receives the input of the user's instruction according to the operation performed by the user on the operation device 22. The display device 23 includes, for example, a liquid crystal display (LCD). The display device 23 displays a response from the control device 21, or a retrieved data.

The communication device 24 is a communication interface that transmits and receives various types of data to and from external devices inside a local area or on the internet, such as the image forming apparatus 1.

The storage device 25 is a large-capacity storage device such as a hard disk drive (HDD) and a solid-state drive (SSD). The storage device 25 contains various control programs. In the terminal device 2, a printer driver 250 is installed in the form of a program. The printer driver 250 is stored in the storage device 25. The storage device 25 includes a hash value storage device 251, which will be subsequently described.

The control device 21 includes a processor, a random-access memory (RAM), a read-only memory (ROM), and an exclusive hardware circuit. The processor is, for example, a central processing unit (CPU), an application specific integrated circuit (ASIC), or a micro processing unit (MPU).

The control device 21 acts as a controller 210, when the processor operates according to a control program stored in the storage device 25. The control device 21 also acts as a print controller 211, when the processor operates according to the printer driver 250 stored in the storage device 25. Here, the controller 210 may be constituted in the form of a hardware circuit, instead of being realized by the operation of the control device 21 according to the control program. This also applies to other embodiments, unless otherwise specifically noted.

The controller 210 serves to control the overall operation of the terminal device 2. The controller 210 is connected to the operation device 22, the display device 23, the communication device 24, and the storage device 25, and controls the operation of the mentioned components.

The print controller 211 converts the document to be printed into print data that can be analyzed by the image forming apparatus 1, and transmits the print data acquired through the conversion to the image forming apparatus 1, via the communication device 24. Thus, the print controller 211 requests the image forming apparatus 1 to print the document.

Figure 2:
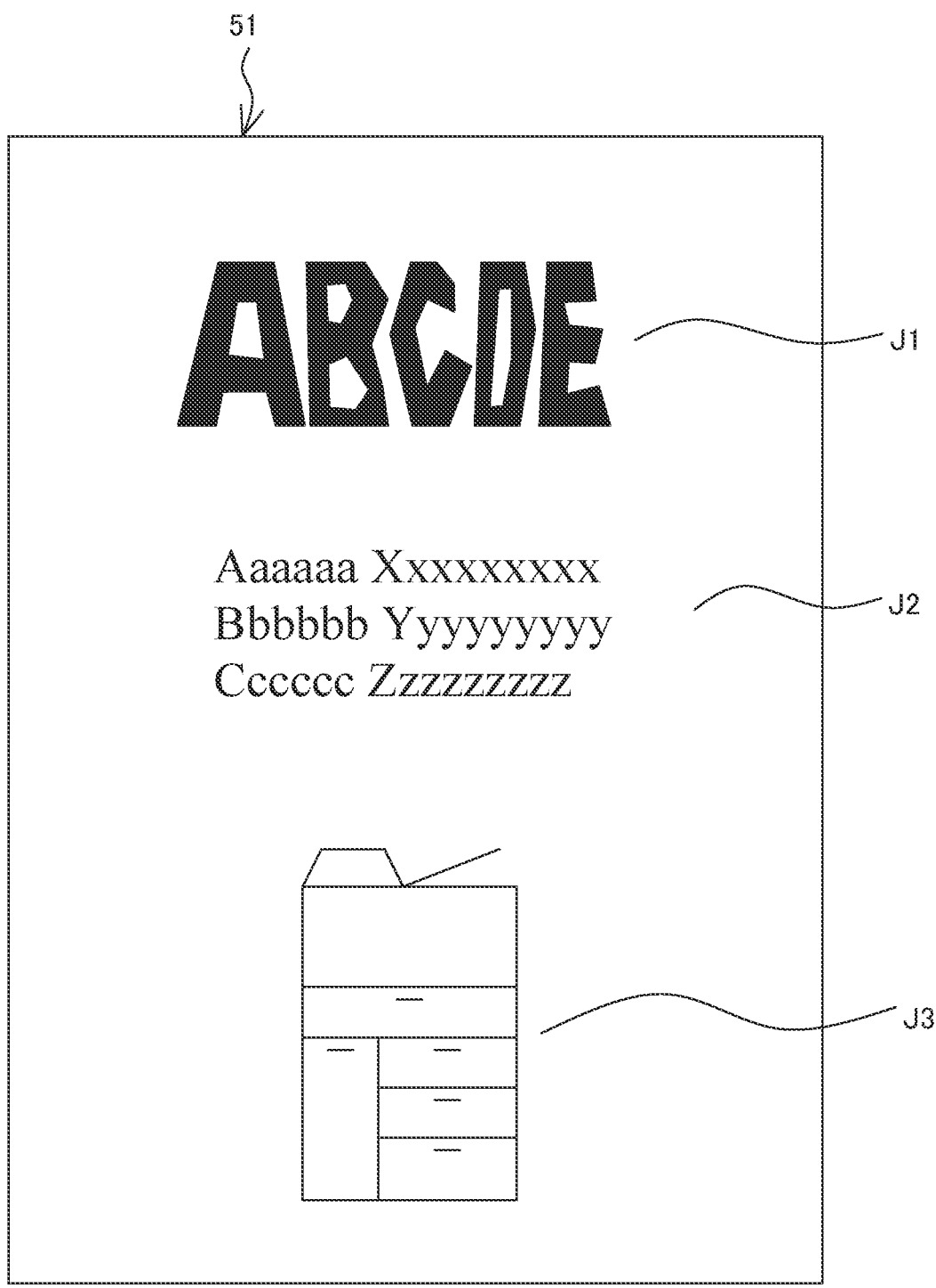
FIG. 2 is a schematic drawing showing an example of a document to be printed.

FIG. 2 illustrates an example of the document to be printed. As shown in FIG. 2, the document 51 represents an image including a plurality of objects J1 to J3. The object J1 represents a logo mark, the object J2 represents character strings, and the object J3 represents an illustration. For example, when the user inputs an instruction to print the document 51 through the operation device 22, the print controller 211 converts the document 51 into a description by page description language (PDL), thereby generating the print data, and transmits the print data thus generated to the image forming apparatus 1 via the communication device 24. Through such an operation, the print controller 211 requests the image forming apparatus 1 to print the document 51.

Figure 3:
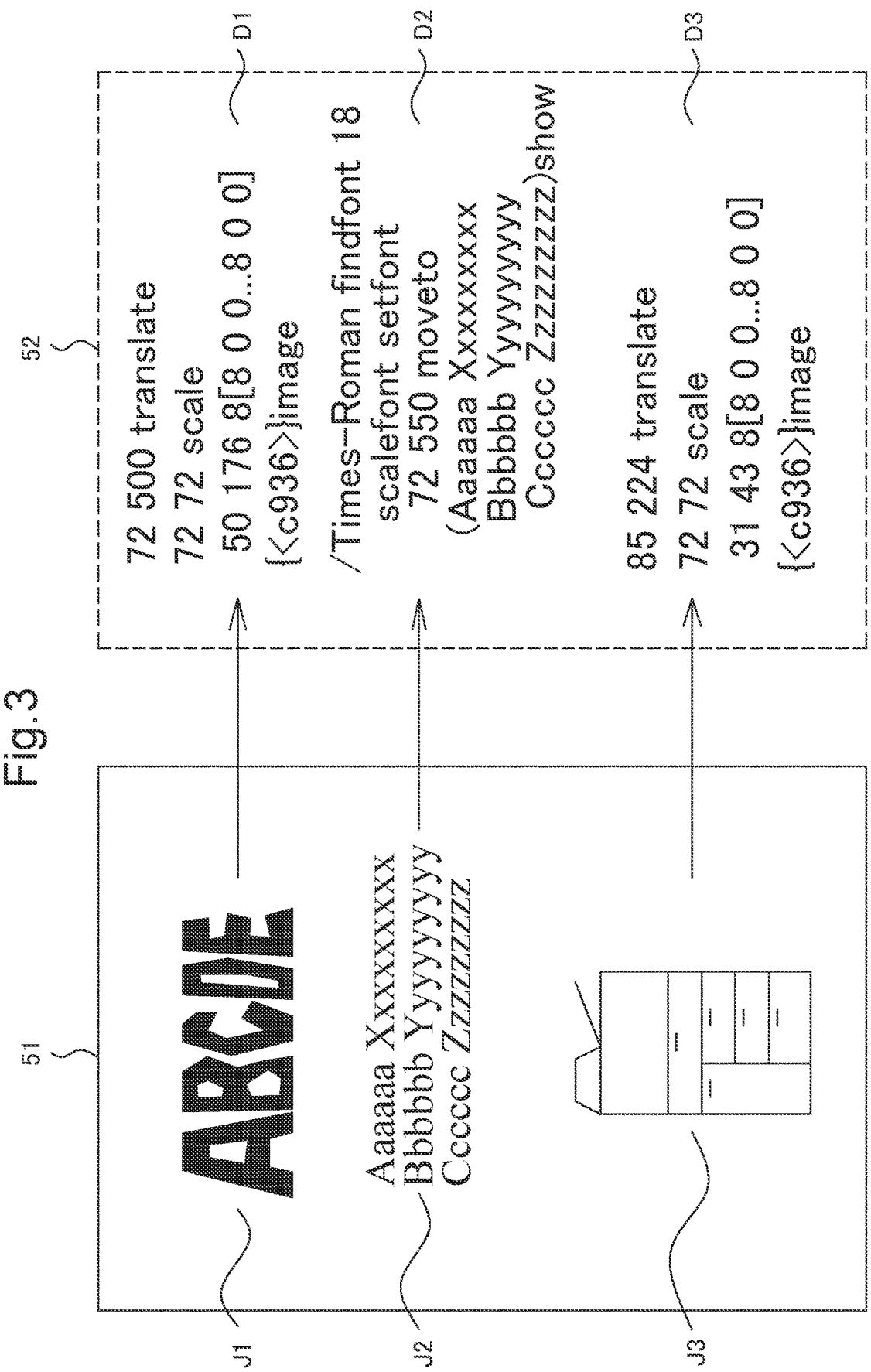
FIG. 3 is a schematic drawing showing conversion of an object included in the document into description by PDL.

FIG. 3 is a schematic drawing showing the conversion of the objects J1 to J3 included in the document 51, into the description by PDL. The print data 52 represents the data converted from the document 51 into the description by PDL. The print data 52 includes object data D1 to D3. The object data D1 to D3 are the data converted from the objects J1 to J3 into the description by PDL, respectively.

Figure 4:
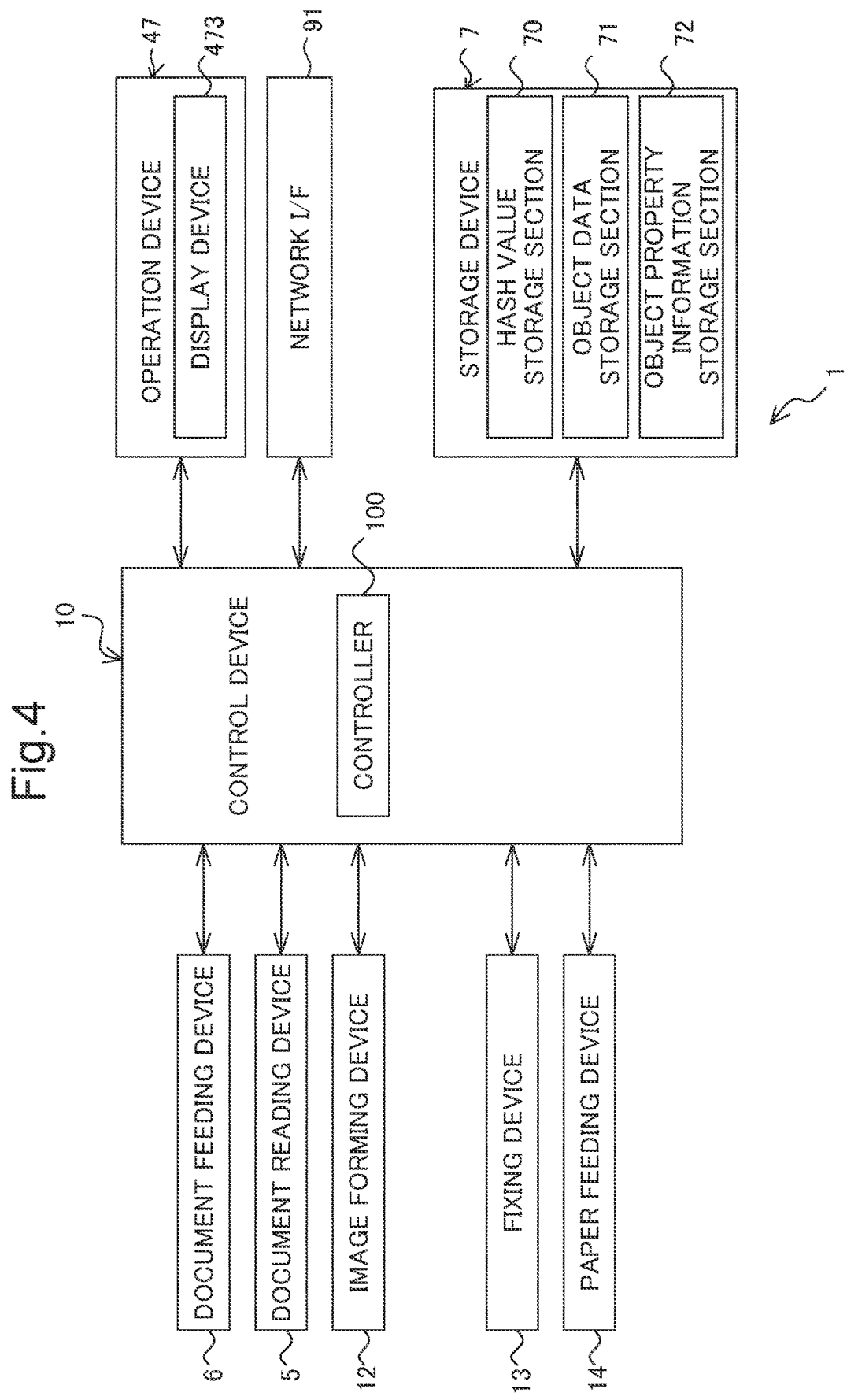
FIG. 4 is a functional block diagram showing an essential internal configuration of an image forming apparatus.

FIG. 4 is a functional block diagram showing an essential internal configuration of the image forming apparatus 1. The image forming apparatus 1 includes a control device 10, a document feeding device 6, a document reading device 5, an image forming device 12, a fixing device 13, a paper feeding device 14, an operation device 47, a network interface (I/F) 91, and a storage device 7.

The document feeding device 6 is openably connected to the upper face of the document reading device 5, for example via a hinge. The document feeding device 6 serves as a document retention cover, when the document reading device 5 reads a source document placed on the platen glass. The document feeding device 6 is configured as an automatic document feeder (ADF). The document feeding device 6 includes a document tray, and delivers the source documents placed thereon one by one, to the document reading device 5.

To perform the document reading operation, the image forming apparatus 1 operates as follows. The document reading device 5 optically reads the image on the source document delivered from the document feeding device 6 to the document reading device 5, or placed on the platen glass, and generates image data. The image data generated by the document reading device 5 is stored, for example, in an image memory.

To perform the image forming operation, the image forming apparatus 1 operates as follows. The image forming device 12 forms a toner image on a recording sheet, serving as a recording medium, and delivered from the paper feeding device 14, on the basis of the image data generated through the document reading operation, the image data stored in the image memory, or image data received from a computer connected via a network.

The fixing device 13 heats and presses the recording sheet on which the toner image has been formed by the image forming device 12, to thereby fix the toner image on the recording sheet. The recording sheet that has undergone the fixing process is delivered to an output tray. The paper feeding device 14 includes a paper cassette.

The operation device 47 includes hard keys for inputting various instructions. The operation device 47 receives instructions from the user to execute the functions and operations that the image forming apparatus 1 is configured to perform. The operation device 47 includes the display device 473 for displaying, for example, an operation guide for the user. The operation device 47 receives, through the touch panel provided on the display device 473, the user's instruction based on the touch operation performed by the user on the operation screen displayed on the display device 473.

The display device 473 includes, for example, an LCD. The display device 473 includes the touch panel. When the user touches a button or a key displayed on the screen, the touch panel detects the instruction corresponding to the touched position.

The network I/F 91 is a communication interface that transmits and receives various types of data to and from external devices inside a local area, or on the internet. For example, the network I/F 91 receives the print data transmitted from the terminal device 2, which is an example of the external devices.

The storage device 7 is a large-capacity storage device such as a HDD and a SSD. The storage device 7 contains various control programs. The storage device 7 includes a hash value storage section 70, an object data storage section 71, and an object property information storage section 72. The hash value storage section 70, the object data storage section 71, and the object property information storage section 72 will be subsequently described.

The control device 10 includes a processor, a RAM, a ROM, and an exclusive hardware circuit. The processor is, for example, a CPU, an ASIC, or an MPU.

The control device 10 acts as a controller 100, when the processor operates according to a control program stored in the storage device 7. Here, the controller 1001 may be constituted in the form of a hardware circuit, instead of being realized by the operation of the control device 10 according to the control program. This also applies to other embodiments, unless otherwise specifically noted.

The controller 100 serves to control the overall operation of the image forming apparatus 1. The controller 100 is connected to the document feeding device 6, the document reading device 5, the image forming device 12, the fixing device 13, the paper feeding device 14, the operation device 47, the network I/F 91, and the storage device 7, and controls the operation of the mentioned components. For example, the controller 100 analyzes the print data transmitted from the terminal device 2 thereby generating bitmap data, and causes the image forming device 12 to perform the printing operation based on the bitmap generated as above.

For example, upon receipt of the print data 52 shown in FIG. 3, transmitted from the terminal device 2, the controller 100 analyzes the object data D1 to D3 included in the print data 52, thereby generating the bitmap data, and causes the image forming device 12 to execute the printing operation based on the bitmap data generated as above.

The controller 100 generates a hash value from the object data included in the print data transmitted from the terminal device 2, and assigns an ID number N to the hash value, when the generated hash value is new. The controller 100 then registers the generated hash value in the hash value storage section 70, in association with the ID number N.

For example, the controller 100 generates the hash value represented by hexadecimal of 32 digits from the object data, using a predetermined hash function. In other words, the controller 100 generates the hash value corresponding to the object data. FIG. 5 illustrates the hash values respectively corresponding to the object data D1 to D3 of the print data 52. The controller 100 generates the hash values H1 to H3 from the object data D1 to D3 respectively, using the hash function.

The controller 100 stores the object data corresponding to the hash value in the object data storage section 71, in association with the ID number N for identifying the hash value. Here, the data amount of the object data is not small, and therefore the controller 100 sets an upper limit to the total data amount or total number of pieces, to the object data to be stored in the object data storage section 71.

The controller 100 stores the object data in the object data storage section 71, or deletes the object data therefrom, according to storage priority R specified on the basis of a predetermined condition. The storage priority R will be subsequently described in further detail.

The controller 100 stores property information of the object data corresponding to the hash value in the object property information storage section 72, in association with the ID number N for identifying the hash value, with respect each of the ID numbers N. FIG. 6 illustrates an example of data structure stored in the object property information storage section 72. The property information stored in the object property information storage section 72 includes the number of times of use (use for the printing) of the object data, the data amount, use frequency, a data ratio, the storage priority R, and a storage flag F. In the object property information storage section 72, data groups each including the ID number N of the object data, and the property information related to each ID number N, are stored.

The use frequency represents the ratio to the total number of times of use. The data ratio represents the ratio to the total data amount. The storage priority R represents the average value of the use frequency and the data ratio. The storage flag F indicates whether the object data may be stored in the object data storage section 71.

When the storage flag F is "1", the controller 100 stores the corresponding object data in the object data storage section 71, but does not store the object data therein, when the storage flag F is "0". In this embodiment, the controller 100 sets the ratio for assigning "1" to the storage flag F, to 50% of all of the data. More specifically, the controller 100 assigns the storage flag F "1" to the upper six pieces of data (50% of the total of 12 pieces), in terms of the storage priority R.

Accordingly, when the property information of the objects shown in FIG. 6 is stored in the object property information storage section 72, the controller 100 stores the object data corresponding to the hash values having the ID number N of "0002", "0004" to "0006", "0010", and "0011", in the object data storage section 71.

Here, although the controller 100 sets the number of pieces of data to which the storage flag F "1" is to be assigned, on the basis of a relative value with respect to the total value (in this case, 50% of the total) in this embodiment, the controller 100 may determine the number of pieces of data to which the storage flag F "1" is to be assigned, on the basis of an absolute value. In other words, the controller 100 may determine in advance the number of pieces of data to which the storage flag F "1" is to be assigned.

The controller 100 transmits the hash value corresponding to the object data stored in the object data storage section 71, to the terminal device 2 via the network I/F 91.

Upon receipt of the hash value transmitted from the image forming apparatus 1, via the communication device 24, the print controller 211 of the terminal device 2 updates the information stored in the hash value storage device 251, with the received hash value. Therefore, the terminal device 2 can be made aware of the object data stored in the image forming apparatus 1.

Figure 7:
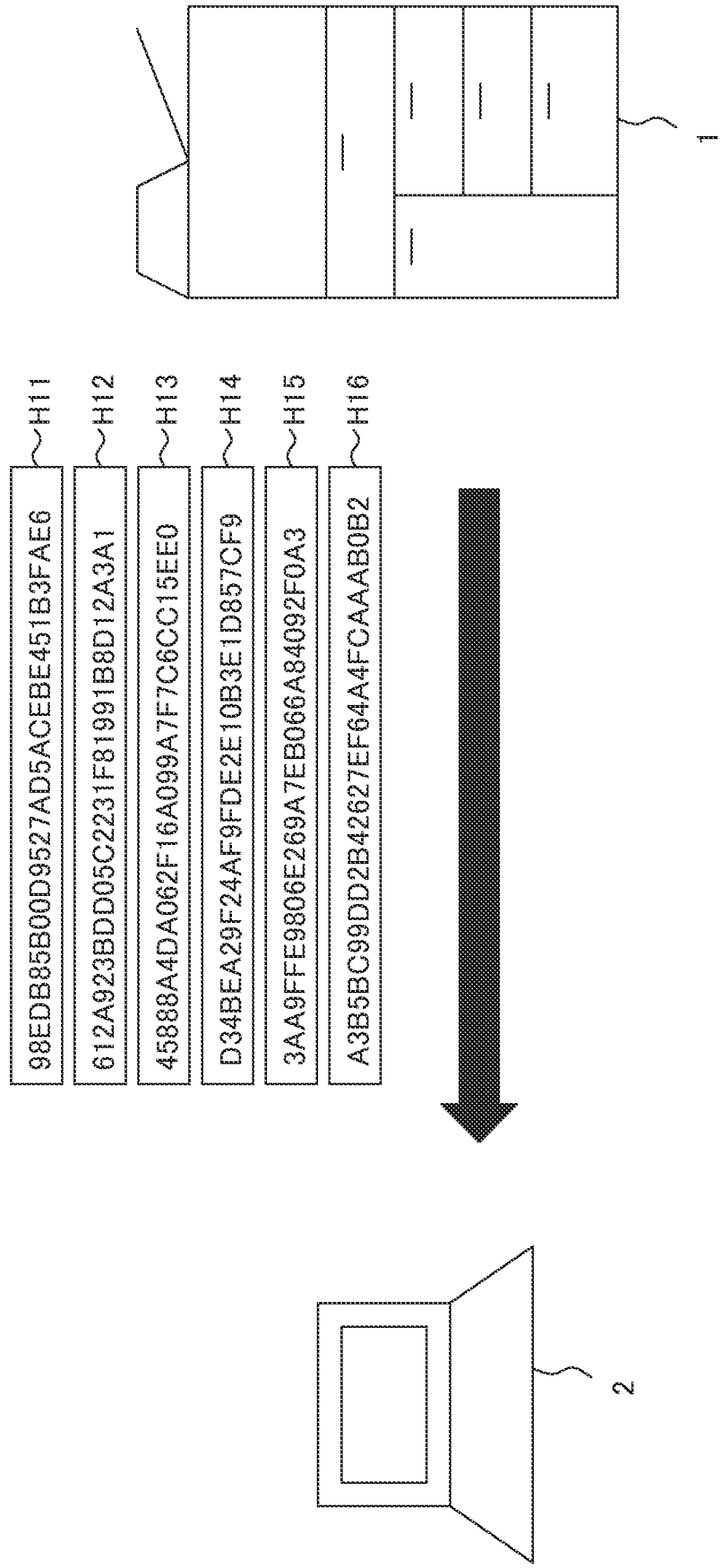
FIG. 7 is a schematic drawing showing how the hash values are transmitted from the image forming apparatus to a terminal device.

FIG. 7 illustrates how the hash values H11 to H16 respectively corresponding to the six pieces of object data, currently stored in the object data storage section 71, are transmitted from the image forming apparatus 1 to the terminal device 2.

The printer driver 250 provided in the terminal device 2 has a function called "print cache", for utilizing the object data stored in the image forming apparatus 1 (object data storage section 71). The print controller 211 validates or invalidates the print cache function, according to the instruction from the user inputted through the operation device 22.

Figure 8:
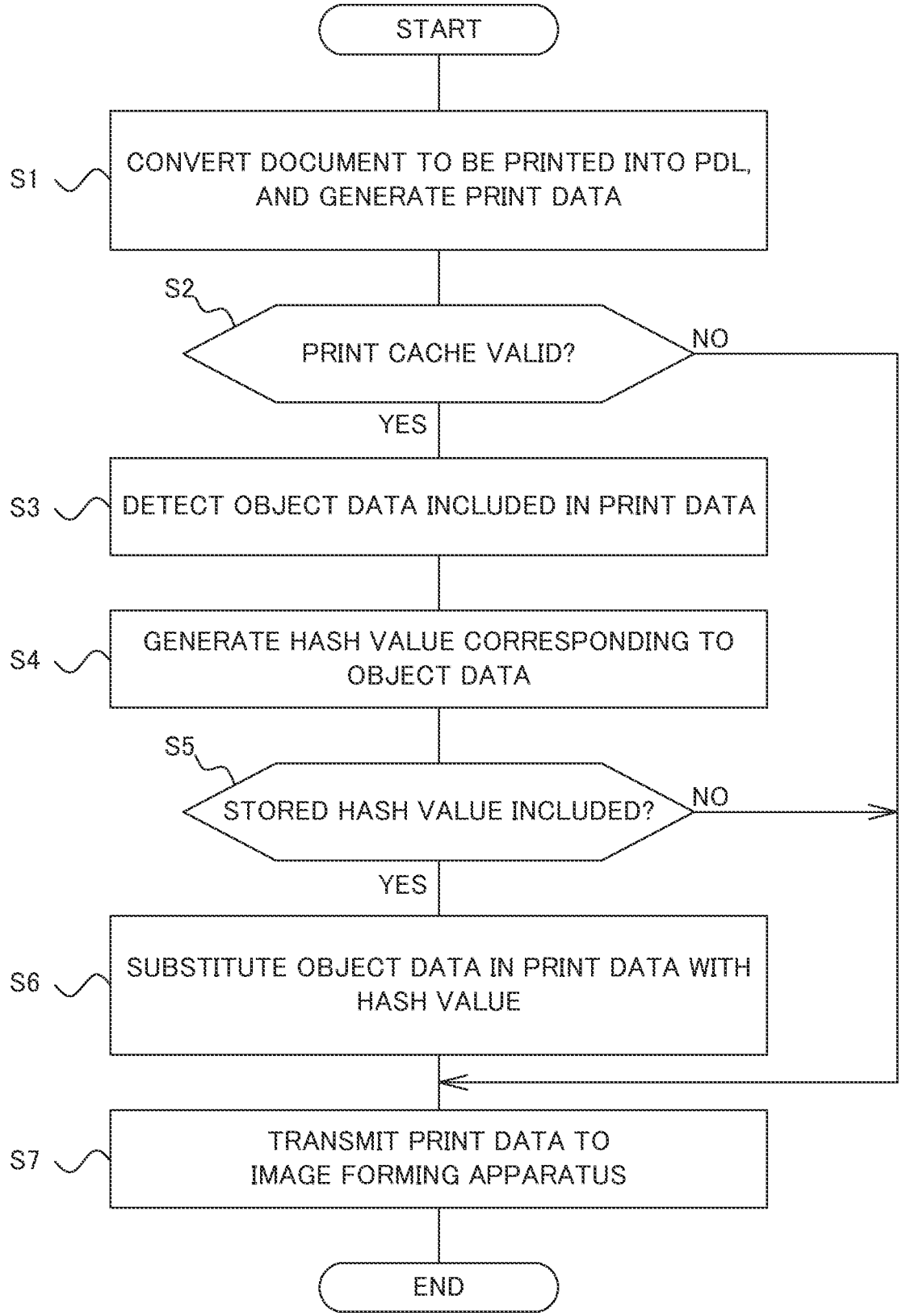
FIG. 8 is a flowchart showing a print data generation process performed by the terminal device.

Referring now to a flowchart shown in FIG. 8, a print data generation process, to be performed by the terminal device 2 when the user's instruction to print the document is inputted, will be described hereunder.

When the user inputs the instruction to print the document, for example through the operation device 22 of the terminal device 2, the print controller 211 converts the document to be printed into the description by PDL, thereby generating the print data (step S1). Further, the print controller 211 decides whether the print cache function is valid (step S2).

Upon deciding that the print cache function is valid (YES at step S2), the print controller 211 detects the object data included in the print data (step S3). For example, the storage device 25 of the terminal device 2 contains the same hash function as that utilized by the image forming apparatus 1, and the print controller 211 generates the hash value for the detected object data, using that hash function (step S4). In other words, the print controller 211 generates, using the hash function, the hash value having a smaller data amount than the object data, with respect to the object data that has been detected.

For example, when the document 51 shown in FIG. 3 is to be printed, the print controller 211 generates the print data 52 including the object data D1 to D3, and generates the hash values H1 to H3 shown in FIG. 5, as the hash values respectively corresponding to the object data D1 to D3.

Then the print controller 211 looks up the hash value storage device 251, and decides whether the hash value stored in the hash value storage device 251 is included in the hash values generated at step S4 (step S5).

When the hash value stored in the hash value storage device 251 is included in the generated hash values (YES at step S5), it can be assumed that the object data corresponding to the hash value in the hash value storage device 251 is stored in the image forming apparatus 1. Accordingly, the print controller 211 substitutes the object data in the print data with the hash value (step S6), and transmits the print data in which the substitution has been done to the image forming apparatus 1, via the communication device 24 (step S7). After step S7, the print controller 211 finishes the print data generation process.

For example, when the hash value H1 corresponding to the object data D1 as shown in FIG. 5 is stored in the hash value storage device 251, it can be assumed that the object data D1 is stored in the image forming apparatus 1. Therefore, the print controller 211 (terminal device 2) transmits the hash value H1, smaller in data amount than the object data D1, to the image forming apparatus 1, instead of transmitting the object data D1.

Figure 9:
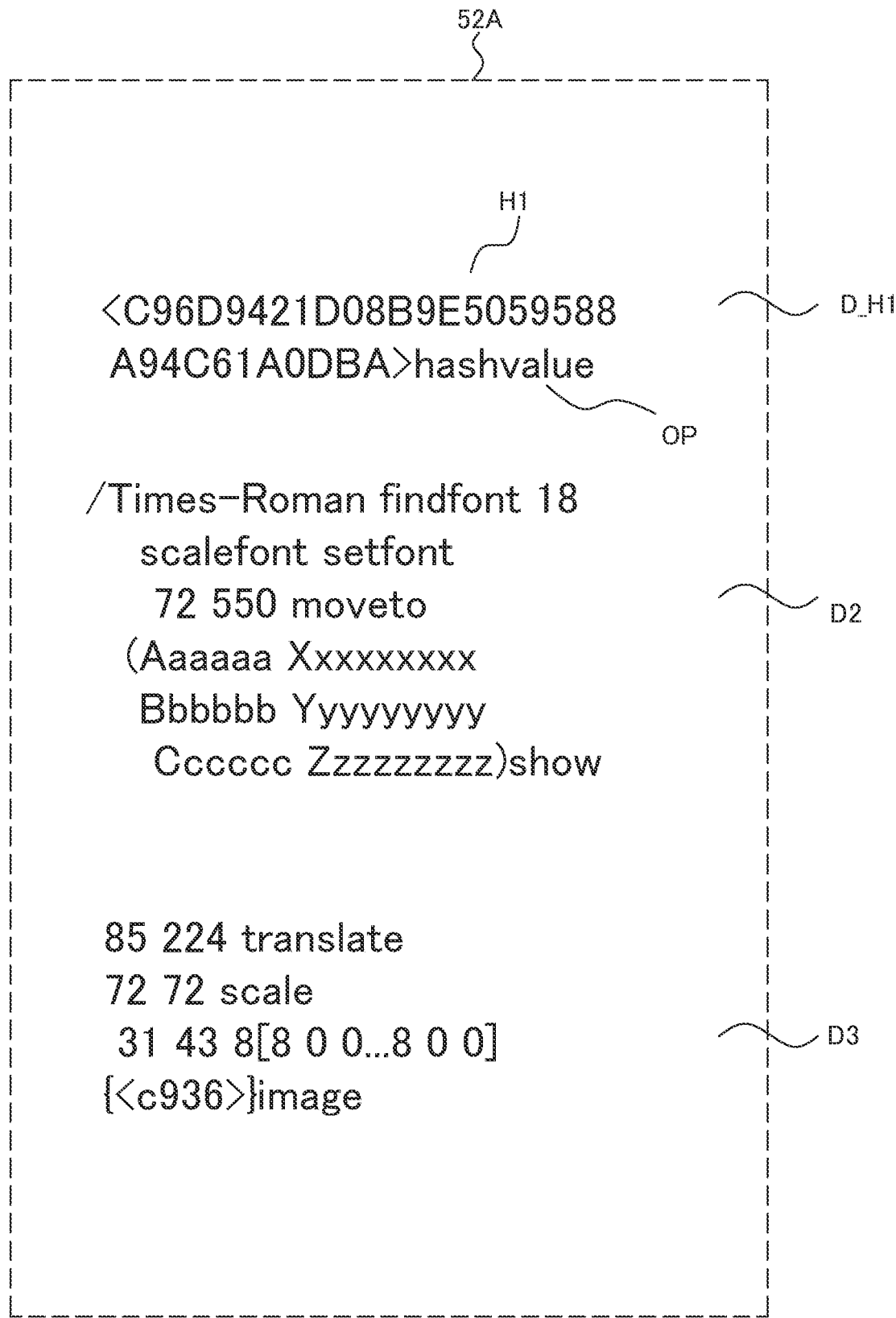
FIG. 9 is a schematic drawing showing an example of the print data in which the object data has been substituted with the hash value.

FIG. 9 illustrates the print data 52A, obtained by substituting the object data D1 included in the print data 52 with the hash value H1. The print controller 211 substitutes the object data D1 with data D_H1, by adding a predetermined operator OP to the hash value H1, to enable the image forming apparatus 1 to identify that the hash value H1 represents the hash value. In this example, the operator OP "hash value" is added.

In contrast, upon deciding at step S5 that the hash value stored in the hash value storage device 251 is not included in the generated hash values (NO at step S5), the print controller 211 transmits the print data generated at step S1 as it is, to the image forming apparatus 1 via the communication device 24 (step S7). After step S7, the print controller 211 finishes the print data generation process.

Upon deciding at step S2 that the print cache function is not valid (NO at step S2), the print controller 211 transmits the print data generated at step S1 as it is, to the image forming apparatus 1 via the communication device 24 (step S7). After step S7, the print controller 211 finishes the print data generation process.

Figure 10A:
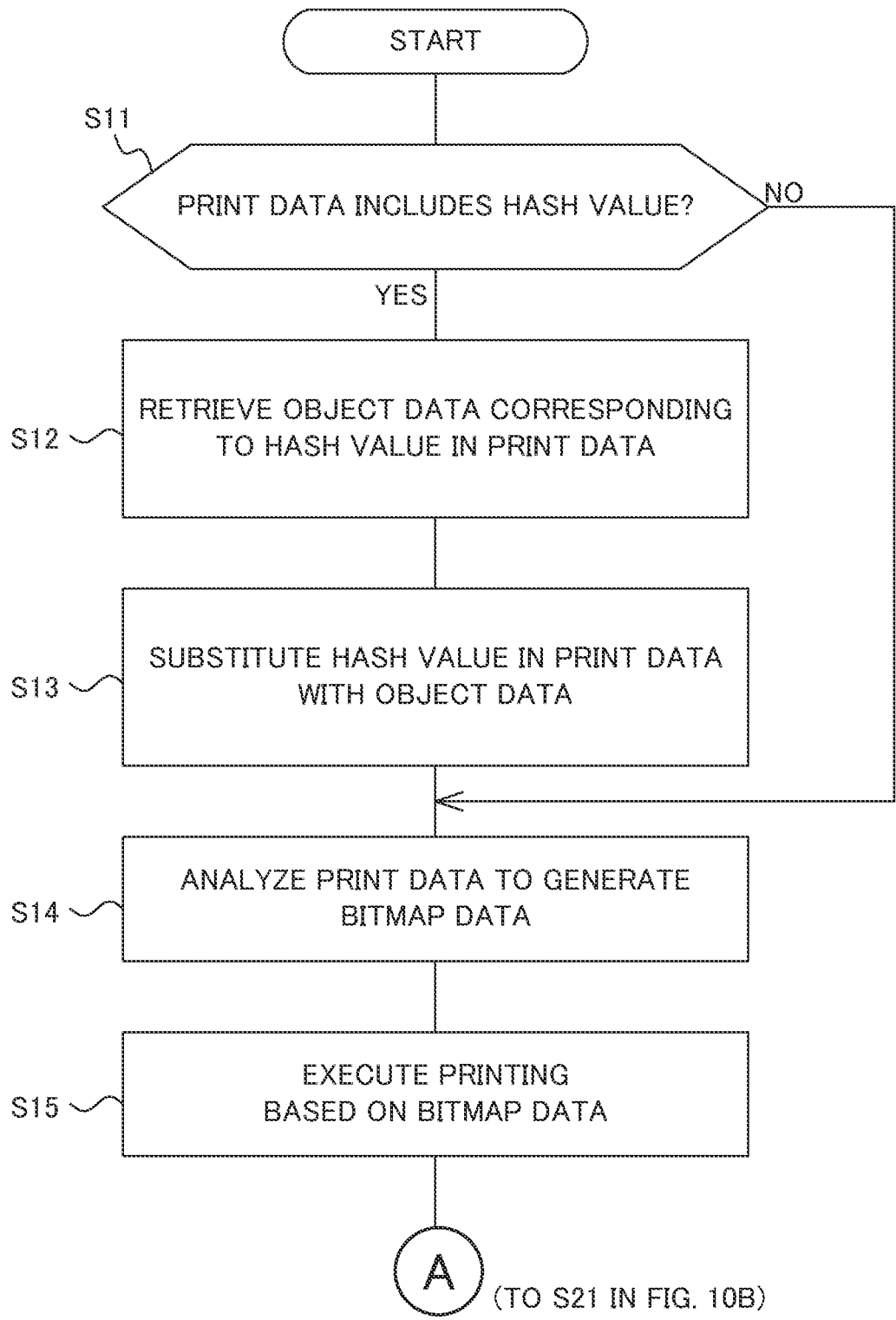
FIG. 10A and FIG. 10B are flowcharts each showing an information update process performed by the image forming apparatus.
Figure 10B:
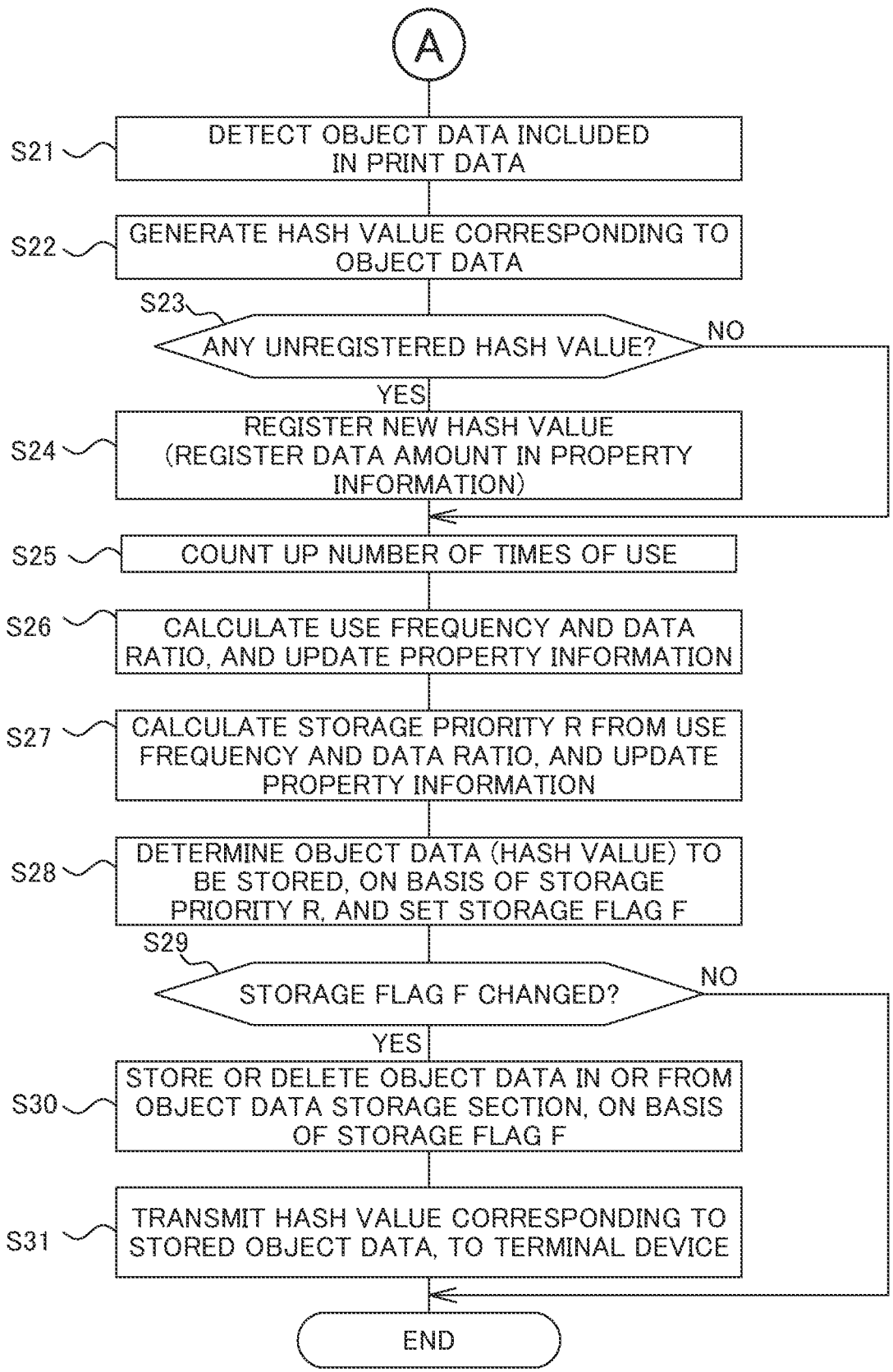

Referring now to flowcharts shown in FIG. 10A and FIG. 10B, an information updating process, to be performed by the image forming apparatus 1 upon receipt of the print data transmitted from the terminal device 2, will be described hereunder.

Upon receipt of the print data transmitted from the terminal device 2, via the network I/F 91, the controller 100 of the image forming apparatus 1 decides whether the received print data includes the hash value (step S11).

For example, when the print data 52A shown in FIG. 9 is received, the controller 100 decides that the print data includes the hash values. However, when the print data 52 shown in FIG. 3 is received, the controller 100 decides that the print data does not include the hash value.

Upon deciding that the print data includes the hash value (YES at S11), the controller 100 retrieves the object data corresponding to the hash value included in the print data, from the object data storage section 71 (step S12), and substitutes the hash value in the print data with the retrieved object data (step S13). Thus, the image forming apparatus 1 can acquire the print data 52 shown in FIG. 3, although the print data 52A shown in FIG. 9 is received.

The controller 100 analyzes the print data acquired as above, thereby generating the bitmap data (step S14), and causes the image forming device 12 to execute the printing operation based on the generated bitmap data (step S15). Thus, the image forming apparatus 1 can produce the printed material representing the document 51 shown in FIG. 2, although the print data 52A shown in FIG. 9 is received.

In contrast, upon deciding at step S11 that the print data does not include the hash value (NO at S11), the controller 100 analyzes the received print data itself, thereby generating the bitmap data (step S14), and causes the image forming device 12 to execute the printing operation based on the bitmap data generated as above (step S15).

After step S15, the controller 100 detects the object data included in the print data (step S21), and generates the hash value corresponding to the detected object data, using the predetermined hash function (step S22). For example, the controller 100 generates the hash values H1 to H3 respectively corresponding to the object data D1 to D3, as shown in FIG. 5.

The controller 100 decides whether the hash values generated as above include an unregistered hash value, not stored in the hash value storage section 70 yet (step S23). Upon deciding that an unregistered hash value is included (YES at step S23), the controller 100 assigns an ID number N for identifying the hash value, and registers the hash value in the hash value storage section 70 in association with the ID number N. At the same time, the controller 100 adds the property information of the object data corresponding to the hash value to the object property information storage section 72, and registers the data amount (step S24). After step S24, the controller 100 proceeds to step S25.

In contrast, upon deciding at step S23 that an unregistered hash value is not included in the generated hash values (NO at step S23), the controller 100 skips the operation of step S24, and proceeds to step S25.

The controller 100 counts up the item "number of times of use" stored in the object property information storage section 72, with respect to the hash value generated at step S22 (step S25).

The controller 100 calculates the use frequency on the basis of the number of times of use of the object data, and the data ratio on the basis of the data amount, thereby updating the items "use frequency" and "data ratio" stored in the object property information storage section 72 (step S26). Further, the controller 100 calculates the storage priority R on the basis of the use frequency and the data ratio of the object data, and updates the item "storage priority R" stored in the object property information storage section 72 (step S27). The controller 100 determines the object data to be stored in the object data storage section 71, on the basis of the storage priority R, and assigns the storage flag F "1" to the object data to be stored, and the storage flag F "0" to the remaining object data (step S28).

The controller 100 then decides whether there has been a change in the storage flag F (step S29). Upon deciding that there has been a change in the storage flag F (YES at step S29), the controller 100 stores the object data in the object data storage section 71 or deletes therefrom, on the basis of the storage flag F (step S30). Accordingly, the object data of a lower storage priority R is deleted from the object data storage section 71, and the object data of a higher storage priority R is stored in the object data storage section 71.

The controller 100 transmits the hash value corresponding to the object data stored in the object data storage section 71 (i.e., hash value corresponding to the ID number N to which the storage flag F "1" is assigned), to the terminal device 2 via the network I/F 91 (step S31). After step S31, the controller 100 finishes the information updating process. The transmission of the hash value is performed as shown in FIG. 7.

In contrast, upon deciding at step S29 that there has not been a change in the storage flag F (NO at step S29), the controller 100 finishes the information updating process, since the object data to be kept in the object data storage section 71 remains the same.

Now, with the foregoing known technique, the bitmap data representing the entire document has to be stored as it is, in other words a large amount of data has to be stored. Such an operation is unpractical. Besides, the printing operation can only be simplified with respect to the same document.

With the arrangement according to the foregoing embodiment, in contrast, the terminal device 2 transmits the hash value, smaller in data amount than the object data, to the image forming apparatus 1, instead of transmitting the object data as it is, thus to request the image forming apparatus 1 to execute the printing. Therefore, the transmission efficiency from the terminal device 2 to the image forming apparatus 1 can be improved, and the printing speed can be improved.

In addition, unlike the foregoing known technique, the document data is substituted with the hash value, not for the document as a whole, but with respect to each of the objects constituting the document, which are smaller than the entire document. Accordingly, the image forming apparatus 1 is exempted from storing the data representing the entire document as the hash value. Therefore, in the case of executing the printing on the basis of the data having a reduced data amount owing to the use of the hash value, the data amount necessary for the printing operation can further be reduced, and the storage region can also be saved.

Further, the object data to be stored in the object data storage section 71 is limited to those of a higher storage priority R, and therefore the storage region can be more efficiently utilized.

The disclosure may be modified in various manners, without limitation to the configuration according to the foregoing embodiments. Although the image forming apparatus in the image forming system according to the disclosure is exemplified by the multifunction peripheral in the foregoing embodiment, the disclosure may be applied to a different type of image forming apparatus, having the copying or printing function.

The configurations and processings according to the foregoing embodiments, described with reference to FIG. 1 to FIG. 10B, are merely exemplary and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. An image forming system comprising an image forming apparatus and a terminal device,
the terminal device including:
a first communication device that makes communication with the image forming apparatus;

a first storage device that stores therein a first hash value corresponding to first object data stored in the image forming apparatus; and a first control device including a processor, and configured to act, when the processor executes a control program as a print controller that:

converts a document to be printed into first print data that can be analyzed by the image forming apparatus, and generates a second hash value corresponding to second object data included in the first print data;

generates, when the second hash value accords with the first hash value, second print data by substituting the second object data in the first print data with the first hash value, and transmits the second print data to the image forming apparatus via the first communication device; and transmits, when the second hash value discords with the first hash value, the first print data to the image forming apparatus via the first communication device, the image forming apparatus including:

a second communication device that makes communication with the terminal device;

a second storage device that stores therein the first object data in association with the first hash value;

an image forming device that executes a printing operation by forming an image on a recording medium; and a second control device including a processor, and configured to act, when the processor executes a control program, as a controller that:

generates first bitmap data by analyzing the first print data, upon receipt of the first print data transmitted from the terminal device, via the second communication device, and causes the image forming device to execute the printing operation on a basis of the first bitmap data; and substitutes, upon receipt of the second print data transmitted from the terminal device, via the second communication device, the first hash value included in the second print data with the first object data corresponding to the first hash value and stored in the second storage device, generates second bitmap data by analyzing the second print data in which the substitution has been done, and causes the image forming device to execute the printing operation on a basis of the second bitmap data.

2. The image forming system according to claim 1, wherein the controller of the image forming apparatus generates the hash value corresponding to the object data included in the first print data or the second print data, as the first hash value, and stores the object data in the second storage device in association with the first hash value, as the first object data.

3. The image forming system according to claim 2, wherein the controller of the image forming apparatus stores the first object data in the second storage device, or deletes the first object data from the second storage device, according to storage priority specified on a basis of a predetermined condition.

4. The image forming system according to claim 3, wherein the controller of the image forming apparatus sets the storage priority such that the first object data of a higher use frequency and of a larger data amount is ranked in a higher place.

5. The image forming system according to claim 1, wherein the controller of the image forming apparatus transmits the first hash value corresponding to the first object data stored in the second storage device to the terminal device via the second communication device, and the print controller of the terminal device updates, upon receipt of the first hash value transmitted from the image forming apparatus, information stored in the first storage device, using the first hash value received.

6. The image forming system according to claim 4, wherein the controller of the image forming apparatus determines a number of pieces of the first object data to be stored in the second storage device, on a basis of a predetermined ratio with respect to a total number of a plurality of pieces of the object data.

7. An image forming method executed by an image forming system including:

a terminal device including a first communication device that makes communication with an image forming apparatus, and a first storage device; and the image forming apparatus including a second communication device that makes communication with the terminal device, a second storage device, and an image forming device that executes a printing operation by forming an image on a recording medium, the image forming method comprising steps executed by the terminal device, including:

a step of storing a first hash value corresponding to first object data stored in the image forming apparatus, in the first storage device;

a step of converting a document to be printed into first print data that can be analyzed by the image forming apparatus, and generating a second hash value corresponding to second object data included in the first print data;

a step of generating, when the second hash value accords with the first hash value, second print data by substituting the second object data in the first print data with the first hash value, and transmitting the second print data to the image forming apparatus via the first communication device; and a step of transmitting the first print data to the image forming apparatus via the first communication device, when the second hash value discords with the first hash value, the image forming method further comprising steps executed by the image forming apparatus, including:

a step of storing the first object data in the second storage device in association with the first hash value;

a step of generating first bitmap data by analyzing the first print data, upon receipt of the first print data transmitted from the terminal device, via the second communication device, and causing the image forming device to execute the printing operation on a basis of the first bitmap data; and a step of substituting, upon receipt of the second print data transmitted from the terminal device, via the second communication device, the first hash value included in the second print data with the first object data corresponding to the first hash value and stored in the second storage device, generating second bitmap data by analyzing the second print data in which the substitution has been done, and causing the image forming device to execute the printing operation on a basis of the second bitmap data.

* * * * *